(12) United States Patent
Sano et al.

(10) Patent No.: US 6,768,591 B2
(45) Date of Patent: Jul. 27, 2004

(54) INTERLEAVER

(75) Inventors: Tomomi Sano, Yokohama (JP); Hiroshi Suganuma, Yokohama (JP); Tamoya Kenmochi, Hashimoto (JP); Tetsuya Iimura, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 14 days.

(21) Appl. No.: 10/328,187

(22) Filed: Dec. 26, 2002

(65) Prior Publication Data

US 2003/0128433 A1 Jul. 10, 2003

(30) Foreign Application Priority Data

Dec. 27, 2001 (JP) ...................................... 2001-398025

(51) Int. Cl.$^7$ ............................................. G02B 27/00
(52) U.S. Cl. ...................... 359/578; 359/577; 359/629; 385/24
(58) Field of Search ................................. 359/577–578, 359/584, 629, 634, 639; 398/82–83, 86, 88, 96; 385/24, 36

(56) References Cited

U.S. PATENT DOCUMENTS 6,690,846 B2 * 2/2004 Zhou et al. .................... 385/15
2002/0180981 A1 * 12/2002 Ducellier et al. ........... 356/491

* cited by examiner

Primary Examiner—Drew A. Dunn
Assistant Examiner—Leo Boutsikaris
(74) Attorney, Agent, or Firm—McDermott Will & Emery LLC

(57) ABSTRACT

An interleaver is provided with an optical system configured to split light having traveled from a first port to a half mirror, into two beams and direct the beams toward first and second reflectors, respectively. Light reflected by the first reflector and arrived at the half mirror is split into two beams and directed toward second and third ports, respectively. Light reflected by the second reflector and arrived at the half mirror is split into two beams directed toward the second and third ports, respectively. An etalon filter configured to cause a loss on either one of light incident thereto from the first port and the beams directed toward the second port and toward the third port.

3 Claims, 3 Drawing Sheets

INTERLEAVER

BACKGROUND OF THE INVENTION

1. Field of the Invention

The present invention relates to an interleaver for demultiplexing light.

2. Related Background Art

An interleaver is a device configured to accept entry of signal light of multiple wavelengths ($\lambda_1$, $\lambda_2$, ..., $\lambda_{2n-1}$, $\lambda_{2n}$, ...) and demultiplex it into signal light in a first wavelength band $\Lambda_1$ ($\lambda_1, \lambda_3, \ldots, \lambda_{2n-1}, \ldots$) and signal light in a second wavelength band $\Lambda_2$ ($\lambda_2, \lambda_4, \ldots, \lambda_{2n}, \ldots$), and is disposed in a repeater of an optical communication system or the like. Various types of such interleavers have been proposed heretofore and the known interleavers include, for example, those including a polarization separator, a wavelength filter, and a polarization combiner, and those including an optical system constituting a Mach-Zehnder interferometer. Another potential interleaver is one including an optical system constituting a Michelson interferometer.

SUMMARY OF THE INVENTION

Incidentally, the interleaver including the optical system constituting the Michelson interferometer employs a Gires-Tournois resonator including a semitransparent mirror with the transmittance of several ten % as one reflector, and total reflection mirrors, thereby achieving a flat-topped spectrum in which an insertion loss is flat near a maximum of the insertion loss in the vicinity of each signal light wavelength. In the case where the flat-topped spectrum is achieved by means of the Gires-Tournois resonator, it is, however, necessary to adjust the spacing between the semitransparent mirror and the total reflection mirrors in the nanometer order, and it is extremely difficult to attain a flat-top characteristic.

On the other hand, there are also cases where a transmission band near each signal light wavelength is set narrow to achieve a characteristic of excellent isolation between signal light wavelengths.

The present invention has been accomplished in order to solve the above problem and an object of the present invention is to provide an interleaver capable of achieving the various characteristics such as the flat-top characteristic, the excellent isolation characteristic, or the like by an extremely simple configuration.

An interleaver according to the present invention comprises an optical system having a first port, a second port, a third port, a half mirror, a first reflector, and a second reflector, and configured to split light having traveled from the first port to the half mirror, into two beams and direct the beams toward the first reflector and toward the second reflector, respectively, to split light having been reflected by the first reflector and having arrived at the half mirror, into two beams and direct the beams toward the second port and toward the third port, respectively, and to split light having been reflected by the second reflector and having arrived at the half mirror, into two beams and direct the beams toward the second port and toward the third port, respectively; and an etalon filter configured to cause a loss on either one of light incident thereto from the first port and the beams directed toward the second port and toward the third port.

In a preferred configuration, a free spectral range of the etalon filter to cause the loss on the light incident thereto from the first port is set at half of a free spectral range of the optical system.

In another preferred configuration, a free spectral range of the etalon filter to cause the loss on the beams directed toward the second port and toward the third port is set at the same as a free spectral range of the optical system.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Interleavers as embodiments of the present invention will be described below with reference to the drawings. In the description, the same elements or elements having the same functions will be denoted by the same reference symbols, and redundant description will be omitted.

First Embodiment

Figure 1:
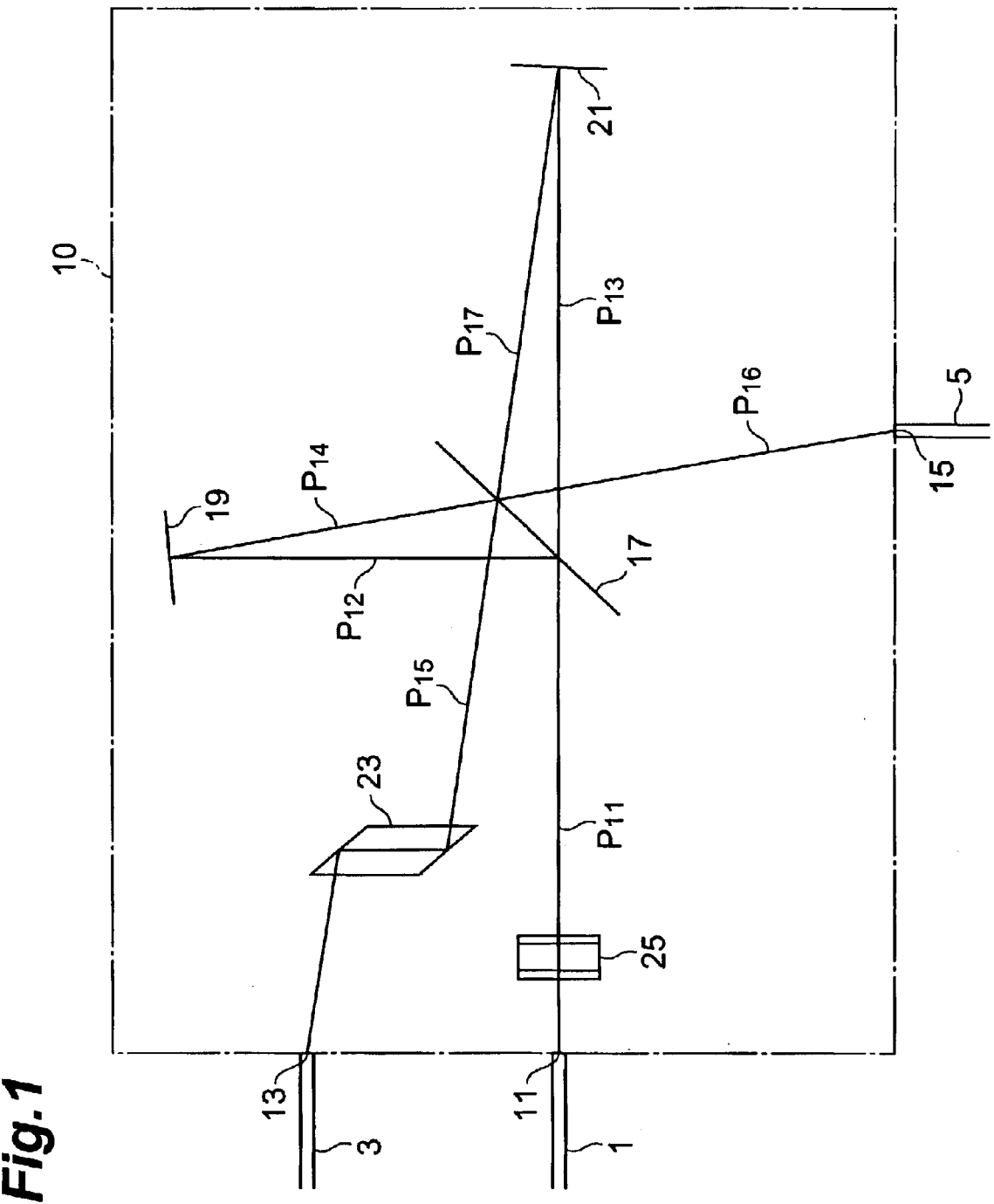
FIG. 1 is a schematic illustration of an interleaver in the first embodiment of the present invention.

First, let us describe the interleaver in the first embodiment of the present invention. FIG. 1 is a schematic illustration of interleaver 10 in the present embodiment.

The interleaver 10 has a first port 11, a second port 13, a third port 15, a half mirror 17, a first reflector (total reflection mirror) 19, a second reflector (total reflection mirror) 21, a diverging prism 23, and an etalon filter 25. The optical system including these first port 11, second port 13, third port 15, half mirror 17, first reflector 19, and second reflector 21 constitutes a Michelson interferometer. Namely, the half mirror 17 splits light having traveled from the first port 11 thereto, into two beams, directs one beam toward the first reflector 19, and directs the other beam toward the second reflector 21. The half mirror 17 also splits light having been reflected by the first reflector 19 and having arrived thereat, into two beams, directs one beam toward the second port 13, and directs the other beam toward the third port 15. The half mirror 17 also splits light having been reflected by the second reflector 21 and having arrived thereat, into two beams, directs one beam toward the second port 13, and directs the other beam toward the third port 15.

The diverging prism 23 is located between the half mirror 17 and the second port 13, and outputs light from the half mirror 17 toward the second port 13 in a state of a widened spacing between the axis of input light from the first port 11 and the axis of output light to the second port 13.

The etalon filter 25 is located between the first port 11 and the half mirror 17, is a loss filter utilizing multiple reflections between two or more parallel planes, and has such a loss characteristic that the loss periodically varies against wavelength. This etalon filter 25 is designed so that the loss becomes maximum or minimum at each of wavelengths of light having traveled from the first port 11 thereto. The etalon filter 25 causes the loss on the light having traveled from the first port 11 thereto, and outputs the light suffering the loss, into an optical path $P_{11}$. The free spectral range (FSR) of the etalon filter 25 is set at half of the free spectral range (FSR) of the optical system constituting the aforementioned Michelson interferometer.

In the case where the etalon filter 25 is designed to have such a loss characteristic as to cause the maximum loss at each of the wavelengths of the light from the first port 11 (where the wavelengths at maxima in the loss characteristic of the etalon filter 25 are identical with the respective wavelengths of the light from the first port 11), the transmission characteristic of the etalon filter 25 becomes such a flat-top characteristic that the transmission spectrum is flat near the maximum transmittance in the vicinity of each wavelength of the light from the first port 11. On the other hand, in the case where the etalon filter 25 is designed to have such a loss characteristic as to cause the minimum loss at each of the wavelengths of the light from the first port 11 (where the wavelengths at maxima in the loss characteristic of the etalon filter 25 are shifted by a half wavelength from the respective wavelengths of the light from the first port 11), the transmission characteristic of the etalon filter 25 becomes such an excellent isolation characteristic that the transmission band is narrowed near the maximum transmittance in the vicinity of each wavelength of the light from the first port 11.

In the optical system constituting the Michelson interferometer as described above, in order to direct the light toward the second port 13 with a difference between the axis of input light from the first port 11 and the axis of output light to the second port 13, the axis of the output light from the half mirror 17 to the first reflector 19 (the optical axis of an optical path $P_{12}$) is arranged to intersect at a predetermined angle over 0° (e.g., 0.4°) with the axis of the reflected light from the first reflector 19 (the optical axis of an optical path $P_{14}$), and the axis of the output light from the half mirror 17 to the second reflector 21 (the optical axis of an optical path $P_{13}$) is arranged to intersect at a predetermined angle over 0° (e.g., 0.4°) with the axis of the reflected light from the second reflector 21 (the optical axis of an optical path $P_{17}$).

In the optical system constituting the foregoing Michelson interferometer, in order to implement the intersection at the aforementioned predetermined angle between the axis of the output light from the half mirror 17 to the first reflector 19 (the optical axis of the optical path $P_{12}$) and the axis of the reflected light from the first reflector 19 (the optical axis of the optical path $P_{14}$), the axis of the output light toward the first reflector 19 (the optical axis of the optical path $P_{12}$) is set to intersect at a predetermined angle except for 90° (e.g., 89.6°) with the reflecting surface of the first reflector 19. Similarly, in order to implement the intersection at the aforementioned predetermined angle between the axis of the output light from the half mirror 17 to the second reflector 21 (the optical axis of the optical path $P_{13}$) and the axis of the reflected light from the second reflector 21 (the optical axis of the optical path $P_{17}$), the axis of the output light toward the second reflector 21 (the optical axis of the optical path $P_{13}$) is set to intersect at a predetermined angle except for 90° (e.g., 89.6°) with the reflecting surface of the second reflector 21.

In the optical system constituting the foregoing Michelson interferometer, the axes of the output light from the half mirror 17 to the second port 13 and to the third port 15 (the optical axes of optical paths $P_{15}$, $P_{16}$) are set to intersect at a predetermined angle except for 45° (e.g., 44.8° and 45.2°) with the splitter surface of the half mirror 17. The axis of the input light from the first port 11 to the half mirror 17 (the optical axis of the optical path $P_{11}$) is set to intersect at 45° with the splitter surface of the half mirror 17.

Another potential setting is such that the axes of the output light from the half mirror 17 to the second port 13 and to the third port 15 (the optical axes of the optical paths $P_{15}$, $P_{16}$) are set to intersect at 45° with the half mirror 17 and the axis of the input light from the first port 11 to the half mirror 17 (the optical axis of the optical path $P_{11}$) is set to intersect at the aforementioned predetermined angle except for 45° with the splitter surface of the half mirror 17. Still another potential setting is such that the axis of the input light from the first port 11 to the half mirror 17 (the optical axis of the optical path $P_{11}$) and the axes of the output light from the half mirror 17 to the second port 13 and to the third port 15 (the optical axes of the optical paths $P_{15}$, $P_{16}$) are set each to intersect at a predetermined angle except for 45° with the splitter surface of the half mirror 17.

The light incident through the optical path $P_{11}$ to the half mirror 17 is split into two beams by the half mirror 17, one beam is outputted into the optical path $P_{12}$, and the other beam is outputted into the optical path $P_{13}$. The light fed from the half mirror 17 into the optical path $P_{12}$ is reflected by the first reflector 19, and the reflected light travels through the optical path $P_{14}$ back to the half mirror 17. The half mirror 17 splits the incoming light into two beams, one of which is outputted into the optical path $P_{15}$ and the other of which is outputted into the optical path $P_{16}$. The light fed from the half mirror 17 into the optical path $P_{13}$ is reflected by the second reflector 21, and the reflected light travels through the optical path $P_{17}$ back to the half mirror 17. The half mirror 17 splits the incoming light into two beams, one of which is outputted into the optical path $P_{15}$ and the other of which is outputted into the optical path $P_{16}$.

The interleaver 10 operates as follows. The light incident through an optical fiber 1 to the first port 11 enters the etalon filter 25 and suffers the loss according to the loss characteristic of the etalon filter 25 to be outputted into the optical path $P_{11}$. The light incident through the optical path $P_{11}$ to the half mirror 17 is split into two beams by the half mirror 17, and the two beams are outputted into the optical paths $P_{12}$, $P_{13}$. The beam fed into the optical path $P_{12}$ travels forward and backward between the half mirror 17 and the first reflector 19 to return through the optical path $P_{14}$ to the half mirror 17. The beam incident through the optical path $P_{14}$ to the half mirror 17 is split into two beams by the half mirror 17, and the beams are outputted into the optical paths $P_{15}$, $P_{16}$. The beam fed into the optical path $P_{13}$ travels forward and backward between the half mirror 17 and the second reflector 21 to return through the optical path $P_{17}$ to the half mirror 17. The beam incident through the optical path $P_{17}$ to the half mirror 17 is split into two beams by the half mirror 17, and the beams are outputted into the optical paths $P_{15}$, $P_{16}$.

The light fed from the half mirror 17 into the optical path $P_{15}$ is light resulting from superposition of parts of the beams arriving at the half mirror 17 through the respective optical paths $P_{14}$ and $P_{17}$, and is fed into an optical fiber 3 in a widened spacing state relative to the optical path $P_{11}$, (the axis of input light) by the diverging prism 23. The light fed from the half mirror 17 into the optical path $P_{16}$ is also light resulting from superposition of parts of the beams arriving at the half mirror 17 through the respective optical paths $P_{14}$ and $P_{17}$, and is fed into an optical fiber 5.

In the interleaver 10, the Michelson interferometer comprised of the optical system including the first port 11, the second port 13, the third port 15, the half mirror 17, the first reflector 19, and the second reflector 21 has the transmission characteristic of the period according to the difference between optical pathlengths of two optical paths. For this reason, the interleaver 10 is able to accept input of signal light of multiple wavelengths ($\lambda_1$, $\lambda_2$, ..., $\lambda_{2n-1}$, $\lambda_{2n}$, ...: ITU-T Grid (a string of light wavelengths for wavelength multiplexing defined by International Telecommunication Union)), demultiplex the signal light, output the signal light in the first wavelength band $\Lambda_1$ ($\lambda_1$, $\lambda_3$, ..., $\lambda_{2n-1}$, ...) into the optical fiber 3, and output the signal light in the second wavelength band $\Lambda_2$ ($\lambda_2$, $\lambda_4$, ..., $\lambda_{2n}$, ...) into the optical fiber 5. Here the wavelengths satisfy the relation $\lambda_1 < \lambda_2 < ... < \lambda_{2n-1} < \lambda_{2n} < ...$.

The light incident through the first port 11 is directed toward the second port 13 and toward the third port 15 by the half mirror 17 and the reflectors 19, 21 included in the optical system forming the Michelson interferometer, as described above. Accordingly, it becomes feasible to realize the interleaver 10 with the optical system necessitating no optical circulator, and the interleaver 10 is an inexpensive one in which the complexity of the optical system is reduced.

The insertion loss in the first wavelength band $\Lambda_1$ ($\lambda_1$, $\lambda_3$, ..., $\lambda_{2n-1}$, ...) and in the second wavelength band $\Lambda_2$ ($\lambda_2$, $\lambda_4$, ..., $\lambda_{2n}$, ...) of the interleaver 10 demonstrates one of the various characteristics, such as the flat-top characteristic, the excellent isolation characteristic, or the like, according to the loss characteristic of the etalon filter 25 located between the first port 11 and the half mirror 17, and these characteristics can be substantialized by the extremely simple configuration.

Figure 2:
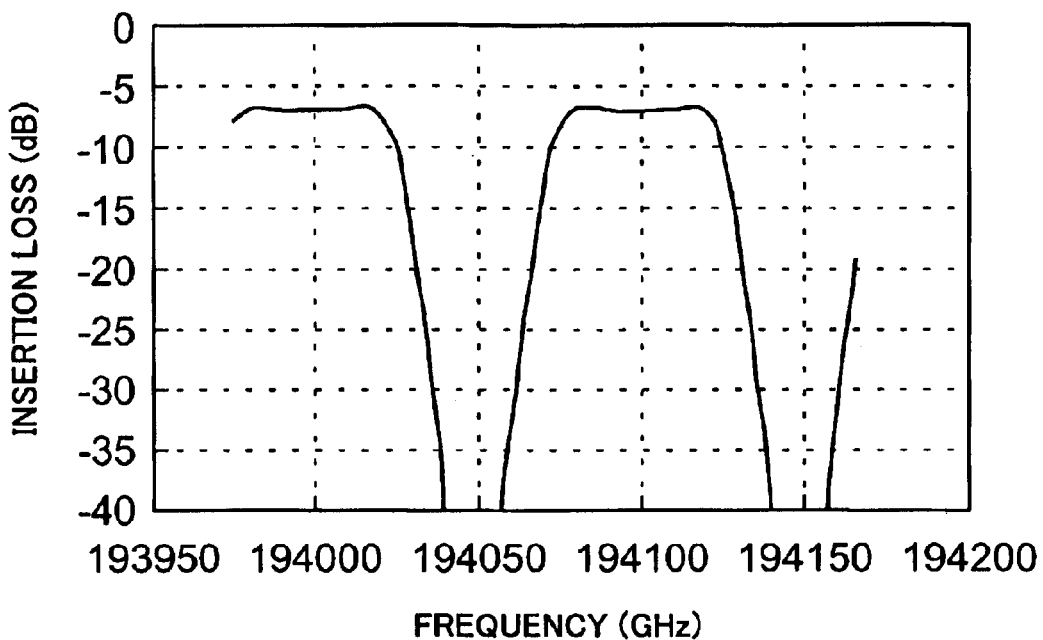
FIG. 2 is a chart showing an example of the insertion loss characteristic in the interleaver in the first embodiment of the present invention.
Figure 3:
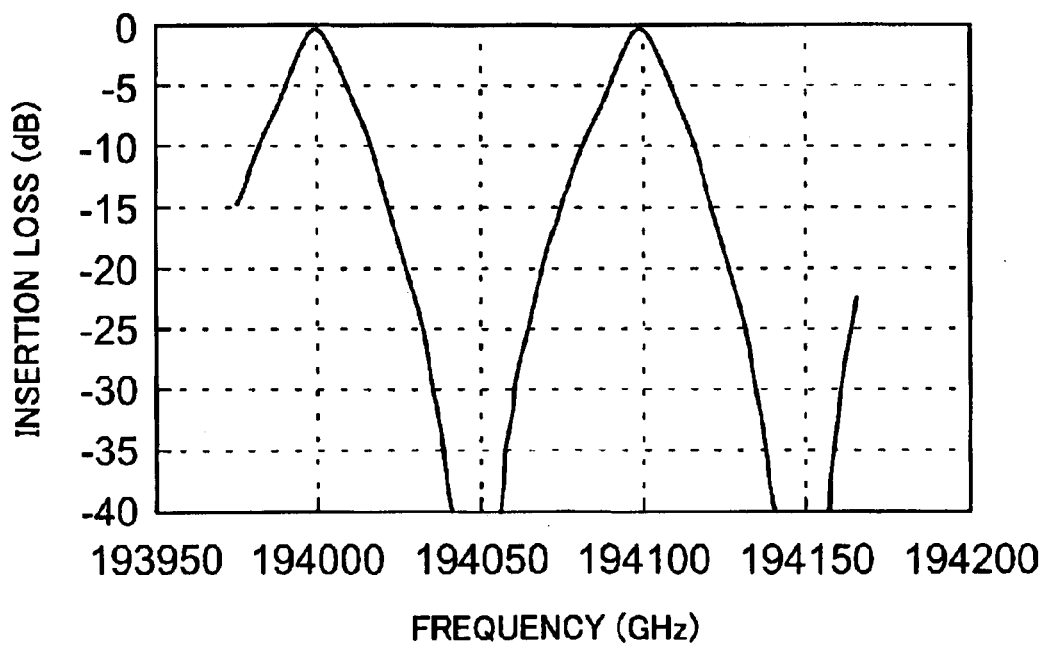
FIG. 3 is a chart showing an example of the insertion loss characteristic in the interleaver in the first embodiment of the present invention.

Now let us describe the results of measurement of the insertion loss characteristics of the interleaver 10 in the above configuration, based on FIGS. 2 and 3. FIGS. 2 and 3 show the insertion loss at each of the frequencies of the signal light emerging from the second port 13 in the interleaver 10. The insertion loss characteristics at each frequency of the signal light emerging from the third port 15 in the interleaver 10 are those shifted by 50 GHz from the characteristics shown in FIGS. 2 and 3.

The settings herein are that FSR of the etalon filter 25 is 50 GHz, the crosstalk of the etalon filter 25 is 7 dB, and FSR of the optical system constituting the Michelson interferometer is 100 GHz. When the signal light entering the first port 11 has the frequencies of ..., 193950 GHz, 194000 GHz, 194050 GHz, 194100 GHz, 194150 GHz, 194200 GHz, ..., the frequencies of the signal light emerging from the second port 13 are ..., 194000 GHz, 194100 GHz, 194200 GHz, ..., and the frequencies of the signal light emerging from the third port 15 are ..., 193950 GHz, 194050 GHz, 194150 GHz, ....

As seen from FIGS. 2 and 3, the characteristic of the interleaver 10 is the flat-top characteristic or the excellent isolation characteristic.

Second Embodiment

Figure 4:
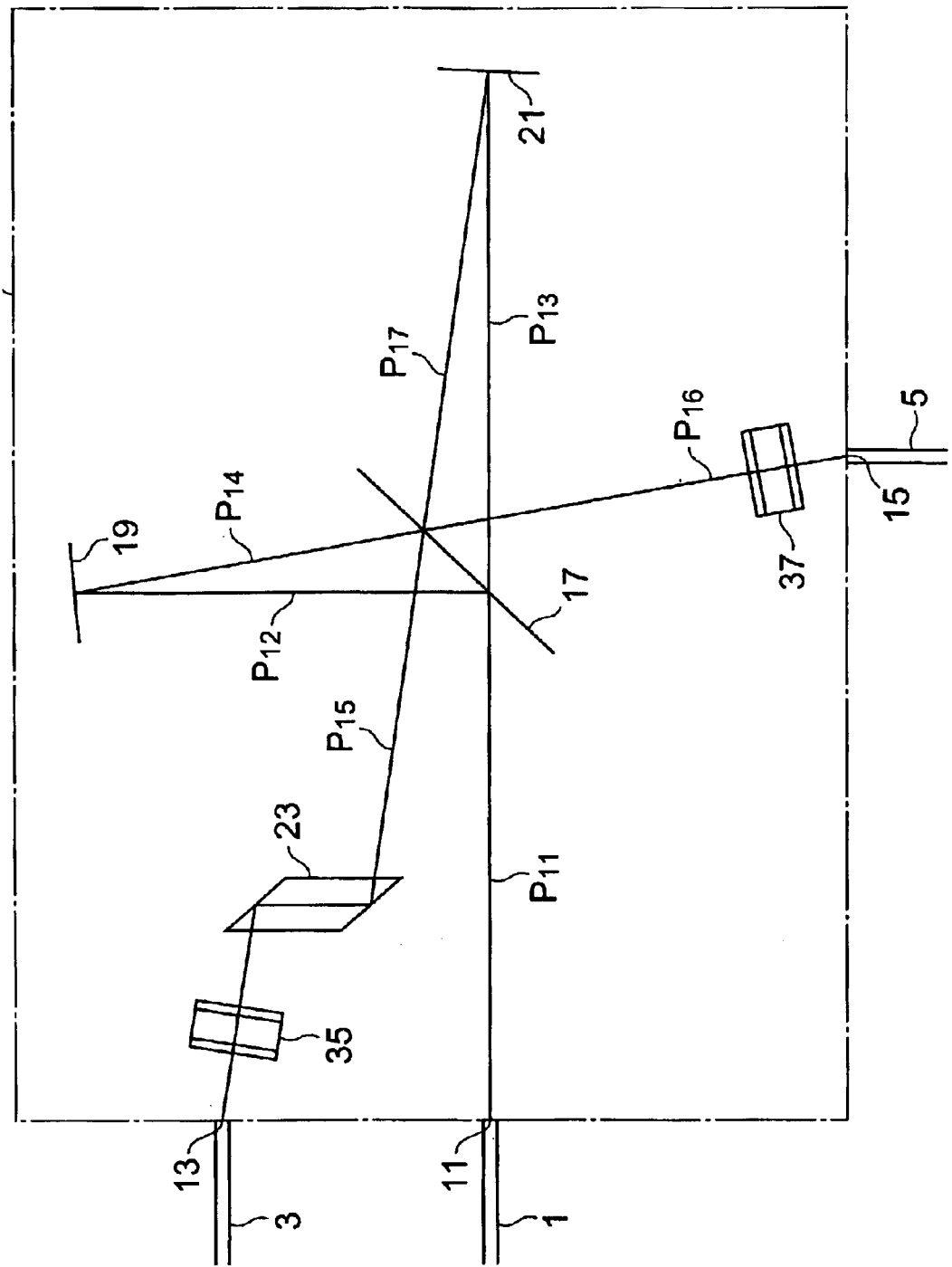
FIG. 4 is a schematic illustration of an interleaver in the second embodiment of the present invention.

Let us next describe the interleaver in the second embodiment of the present invention. FIG. 4 is a schematic illustration of interleaver 30 in the present embodiment.

The interleaver 30 has a first port 11, a second port 13, a third port 15, a half mirror 17, a first reflector (total reflection mirror) 19, a second reflector (total reflection mirror) 21, a diverging prism 23, an etalon filter 35, and an etalon filter 37.

The etalon filter 35 is located between the half mirror 17 and the second port 13 and is a loss filter utilizing multiple reflections between two or more planes, which has such a loss characteristic that the loss periodically varies against wavelength. This etalon filter 35 is designed so that the loss becomes maximum or minimum at each of wavelengths of light from the half mirror 17. The etalon filter 35 causes the loss on the light from the half mirror 17 and outputs the light suffering the loss, to the second port 13. The free spectral range (FSR) of the etalon filter 35 is set at the same as the free spectral range (FSR) of the optical system constituting the foregoing Michelson interferometer.

In the case where the etalon filter 35 is designed to have such a loss characteristic as to cause the maximum loss at each of the wavelengths of the light from the half mirror 17 (where the wavelengths at maxima in the loss characteristic of the etalon filter 35 are identical with the respective wavelengths of the light from the half mirror 17), the transmission characteristic of the etalon filter 35 becomes such a flat-top characteristic that the transmission spectrum is flat near the maximum transmittance in the vicinity of each wavelength of the light from the half mirror 17. On the other hand, in the case where the etalon filter 35 is designed to have such a loss characteristic as to cause the minimum loss at each of the wavelengths of the light from the half mirror 17 (where the wavelengths at maxima in the loss characteristic of the etalon filter 35 are shifted by a half wavelength from the respective wavelengths of the light from the half mirror 17), the transmission characteristic of the etalon filter 35 becomes such an excellent isolation characteristic that the transmission band is narrowed near the maximum transmittance in the vicinity of each wavelength of the light from the half mirror 17.

The etalon filter 37 is located between the half mirror 17 and the third port 15 and is a loss filter utilizing multiple reflections between two or more parallel planes, which has such a loss characteristic that the loss periodically varies against wavelength. This etalon filter 37 is designed so that the loss becomes maximum or minimum at each of the wavelengths of the light from the half mirror 17. The etalon filter 37 causes the loss on the light from the half mirror 17 and outputs the light suffering the loss, to the third port 15. The free spectral range (FSR) of the etalon filter 37 is set at the same as the free spectral range (FSR) of the optical system constituting the aforementioned Michelson interferometer.

In the case where the etalon filter 37 is designed to have such a loss characteristic as to cause the maximum loss at each of the wavelengths of the light from the half mirror 17 (where the wavelengths at maxima in the loss characteristic of the etalon filter 37 are identical with the respective wavelengths of the light from the half mirror 17), the transmission characteristic of the etalon filter 37 becomes such a flat-top characteristic that the transmission spectrum is flat near the maximum transmittance in the vicinity of each wavelength of the light from the half mirror 17. On the other hand, in the case where the etalon filter 37 is designed to have such a loss characteristic as to cause the minimum loss at each of the wavelengths of the light from the half mirror 17 (where the wavelengths at maxima in the loss characteristic of the etalon filter 37 are shifted by a half wavelength from the respective wavelengths of the light from the half mirror 17), the transmission characteristic of the etalon filter 37 becomes such an excellent isolation characteristic that the transmission band is narrowed near the maximum transmittance in the vicinity of each wavelength of the light from the half mirror 17.

The wavelengths at maxima in the loss characteristic of the etalon filter 35 are shifted by half of the free spectral range (FSR) of the optical system forming the Michelson interferometer, from the wavelengths at maxima in the loss characteristic of the etalon filter 37. For example, in the case where FSR of the optical system constituting the Michelson interferometer is 100 GHz, FSR of the etalon filters 35, 37 is set at 100 GHz, and a shift of 50 GHz is given between the wavelengths at maxima in the loss characteristic of the etalon filter 35 and the wavelengths at maxima in the loss characteristic of the etalon filter 37.

The interleaver 30 operates as follows. The light entering the first port 11 through the optical fiber 1 is fed into the optical path $P_{11}$. The light entering the half mirror 17 through the optical path $P_{11}$ is split into two beams by the half mirror 17 and the beams are fed into the optical paths $P_{12}$, $P_{13}$. The beam fed into the optical path $P_{12}$ travels forward and backward between the half mirror 17 and the first reflector 19 to return through the optical path $P_{14}$ to the half mirror 17. The light entering the half mirror 17 through the optical path $P_{14}$ is split into two beams by the half mirror 17, and the beams are fed into the optical paths $P_{15}$, $P_{16}$. The light fed into the optical path $P_{13}$ travels forward and backward between the half mirror 17 and the second reflector 21 to return through the optical path $P_{17}$ to the half mirror 17. The light entering the half mirror 17 through the optical path $P_{17}$ is split into two beams by the half mirror 17, and the beams are fed into the optical paths $P_{15}$, $P_{16}$.

The light fed from the half mirror 17 into the optical path $P_{15}$ is light resulting from superposition of parts of the beams arriving at the half mirror 17 through the respective optical paths $P_{14}$ and $P_{17}$, is incident into the etalon filter 35 in a widened spacing state relative to the optical path $P_{11}$ (the axis of input light) by the diverging prism 23, and suffers loss according to the loss characteristic of the etalon filter 35 to be fed into the optical fiber 3. The light fed from the half mirror 17 into the optical path $P_{16}$ is also light resulting from superposition of parts of the beams arriving at the half mirror 17 through the respective optical paths $P_{14}$ and $P_{17}$, is incident to the etalon filter 37, and suffers the loss according to the loss characteristic of the etalon filter 37 to be fed into the optical fiber 5.

In the interleaver 30, the Michelson interferometer comprised of the optical system including the first port 11, the second port 13, the third port 15, the half mirror 17, the first reflector 19, and the second reflector 21 has the transmission characteristic of the period according to the difference between optical pathlengths of two optical paths. For this reason, the interleaver 30 is able to accept input of signal light of multiple wavelengths ($\lambda_1, \lambda_2, \ldots, \lambda_{2n-1}, \lambda_{2n}, \ldots$: ITU-T Grid (a string of light wavelengths for wavelength multiplexing defined by International Telecommunication Union)), demultiplex the signal light, output the signal light in the first wavelength band $\Lambda_1$ ($\lambda_1, \lambda_3, \ldots, \lambda_{2n-1}, \ldots$) into the optical fiber 3, and output the signal light in the second wavelength band $\Lambda_2$ ($\lambda_2, \lambda_4, \ldots, \lambda_{2n}, \ldots$) into the optical fiber 5. Here the wavelengths satisfy the relation $\lambda_1 < \lambda_2 < \ldots < \lambda_{2n-1} < \lambda_{2n} < \ldots$.

The light incident through the first port 11 is directed toward the second port 13 and toward the third port 15 by the half mirror 17 and the reflectors 19, 21 included in the optical system forming the Michelson interferometer, as described above. Accordingly, it becomes feasible to realize the interleaver 30 with the optical system necessitating no optical circulator, and the interleaver 30 is an inexpensive one in which the complexity of the optical system is reduced.

The insertion loss in the first wavelength band $\Lambda_1$ ($\lambda_1, \lambda_3, \ldots, \lambda_{2n-1}, \ldots$) and in the second wavelength band $\Lambda_2$ ($\lambda_2, \lambda_4, \ldots, \lambda_{2n}, \ldots$) of the interleaver 30 demonstrates one of the various characteristics, such as the flat-top characteristic, the excellent isolation characteristic, or the like, according to the loss characteristics of the etalon filter 35 located between the half mirror 17 and the second port 13 and the etalon filter 37 located between the half mirror 17 and the third port 15, and these characteristics can be substantialized by the extremely simple configuration.

It is noted that the present invention is by no means intended to be limited to the above embodiments but can be modified in various ways. For example, the optical system constituting the Michelson interferometer may be arranged in such a configuration that one of the output light axes is coincident with the input light axis. This configuration requires an optical circulator for separating the output light from the input light. For this reason, the etalon filter to cause the loss on the input light from the first port is located between the first port and the optical circulator. The etalon filter to cause the loss on the output light toward the second port is located between the optical circulator and the second port.

In the present invention, as detailed above, the light suffering the loss in the etalon filter is fed into the optical system constituting the Michelson interferometer, or the light outputted from the optical system constituting the Michelson interferometer is subjected to the loss in the etalon filters. Accordingly, the present invention has succeeded in providing the interleaver capable of realizing the various characteristics such as the flat-top characteristic, the excellent isolation characteristic, or the like by the extremely simple configuration.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed:

1. An interleaver comprising:
   an optical system having a first port, a second port, a third port, a half mirror, a first reflector, and a second reflector, and configured to split light having traveled from the first port to the half mirror, into two beams and direct the beams toward the first reflector and toward the second reflector, respectively, to split light having been reflected by the first reflector and having arrived at the half mirror, into two beams and direct the beams toward the second port and toward the third port, respectively, and to split light having been reflected by the second reflector and having arrived at the half mirror, into two beams and direct the beams toward the second port and toward the third port, respectively; and
   an etalon filter configured to cause a loss on either one of light incident thereto from the first port and the beams directed toward the second port and toward the third port.

2. The interleaver according to claim 1, wherein a free spectral range of the etalon filter to cause the loss on the light incident thereto from the first port is set at half of a free spectral range of the optical system.

3. The interleaver according to claim 1, wherein a free spectral range of the etalon filter to cause the loss on the beams directed toward the second port and toward the third port is set at the same as a free spectral range of the optical system.

* * * * *